(12) United States Patent
de la Borbolla (10) Patent No.: US 8,158,884 B2
(45) Date of Patent: Apr. 17, 2012

(54) ANGLED SLOTS FOR INSTALLATION OF OUTDOOR METALLIC BOXES

(75) Inventor: Ian Rubin de la Borbolla, Memphis, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 273 days.

(21) Appl. No.: 12/619,207

(22) Filed: Nov. 16, 2009
(Under 37 CFR 1.47)

(65) Prior Publication Data
US 2010/0122826 A1 May 20, 2010

Related U.S. Application Data

(60) Provisional application No. 61/199,476, filed on Nov. 17, 2008.

(51) Int. Cl.
*H02G 3/08* (2006.01)
(52) U.S. Cl. ............... 174/54; 174/50; 174/58; 174/61; 220/3.2; 220/3.3; 248/906
(58) Field of Classification Search ............ 174/50, 174/53, 57, 58, 17 R, 61, 63, 54; 220/3.2–3.9, 220/4.02; 248/906, 343
See application file for complete search history.

(56) References Cited

U.S. PATENT DOCUMENTS

| 2,154,310 | A | 4/1939 | Kinnard | |
|---|---|---|---|---|
| 2,240,187 | A | 4/1941 | Kingdon et al. | |
| 2,663,454 | A | 12/1953 | Olson | |
| 2,757,817 | A | 8/1956 | Egan | |
| 4,640,433 | A | 2/1987 | Jorgensen et al. | |
| 5,043,536 | A | 8/1991 | DeBartolo, Jr. | |
| 5,444,183 | A | 8/1995 | Gehrs et al. | |
| 5,744,753 | A * | 4/1998 | Nattel | 174/58 |
| 6,632,998 | B1 | 10/2003 | Gretz | |
| 6,956,168 | B2 | 10/2005 | Herth | |
| 6,956,169 | B1 * | 10/2005 | Shotey et al. | 174/58 |
| 6,979,780 | B1 * | 12/2005 | Lalancette | 174/50 |
| 7,109,415 | B2 | 9/2006 | Neitzel et al. | |
| 7,353,961 | B2 | 4/2008 | Hull et al. | |
| 7,378,590 | B1 * | 5/2008 | Herth | 174/50 |

* cited by examiner

*Primary Examiner* — Angel R Estrada
(74) *Attorney, Agent, or Firm* — Hoffmann & Baron, LLP (57) ABSTRACT

An outdoor metallic electrical outlet box that includes a back wall having a perimetrical edge and an interior portion; a side wall extending from the back wall to an open front to define a box interior; and one or more niches. Each niche has a base integrally formed in the back wall that extends inwardly from the perimetrical edge to the interior portion of the back wall to a recessed side wall and does not extend beyond the perimetrical edge of the back wall. The recessed side wall extends from the base to a point on the side wall of the box intermediate the base and the open front. The recessed side wall tapers towards the side wall of the box as it extends from the base and has a curved shape. Each base has a mounting screw aperture for attaching the electrical outlet box to a structure.

20 Claims, 6 Drawing Sheets

FIG. 8
DETAIL A

ANGLED SLOTS FOR INSTALLATION OF OUTDOOR METALLIC BOXES

This application claims priority from provisional application Ser. No. 61/199,476, filed on Nov. 17, 2008, which is incorporated herein in its entirety.

FIELD OF THE INVENTION

The present invention relates to metallic boxes with slots for mounting the box to a structure. In particular, the present invention relates to outdoor metallic boxes with angled slots that are used for installing the box. The present invention also relates to outdoor metallic boxes that have connections that can receive conduits of different sizes and that have threaded knock-outs in the openings for the connections.

BACKGROUND OF INVENTION

Electrical boxes are used for a variety of applications such as the termination or splicing of electrical wires or the connection to a terminal block or an electrical device. Typically, electrical boxes have a back wall and four or more side walls that define an open side and an interior space. The back wall and side walls can have one or more openings for the passage of wires or cables into the interior or they can be provided with knockouts that can be selectively removed by the user to form the openings. Electrical boxes can be mounted to a structure in a variety of different ways depending on the specific requirements of the user. For some applications, electrical boxes are mounted on the surface of a structure and, for other applications, electrical boxes are mounted in the structure, e.g. inside a wall. Depending on the application and location, electrical boxes can be mounted either in a horizontal or vertical orientation. After the box is installed and the wires entering the box are either spliced together or connected to an electrical device, a cover and/or face plate is secured to the open side of the box.

Due to the varied needs for electrical power and switching, it is sometimes necessary to mount a box outdoors or in a location where it will be exposed to wet conditions. Such installations can include an outdoor receptacle used to provide electricity for lighting, power tools and appliances or an installation for an industrial application. When an application exposes an electrical box to water, it is necessary to design the box so that water does not enter the box and damage the device inside or cause a "short circuit." An effective way to prevent water from entering an electrical box is to install a cover over the faceplate. In addition, a gasket for the cover and seals for the openings in the walls of the box can provide a weatherproof enclosure.

Figure 1:
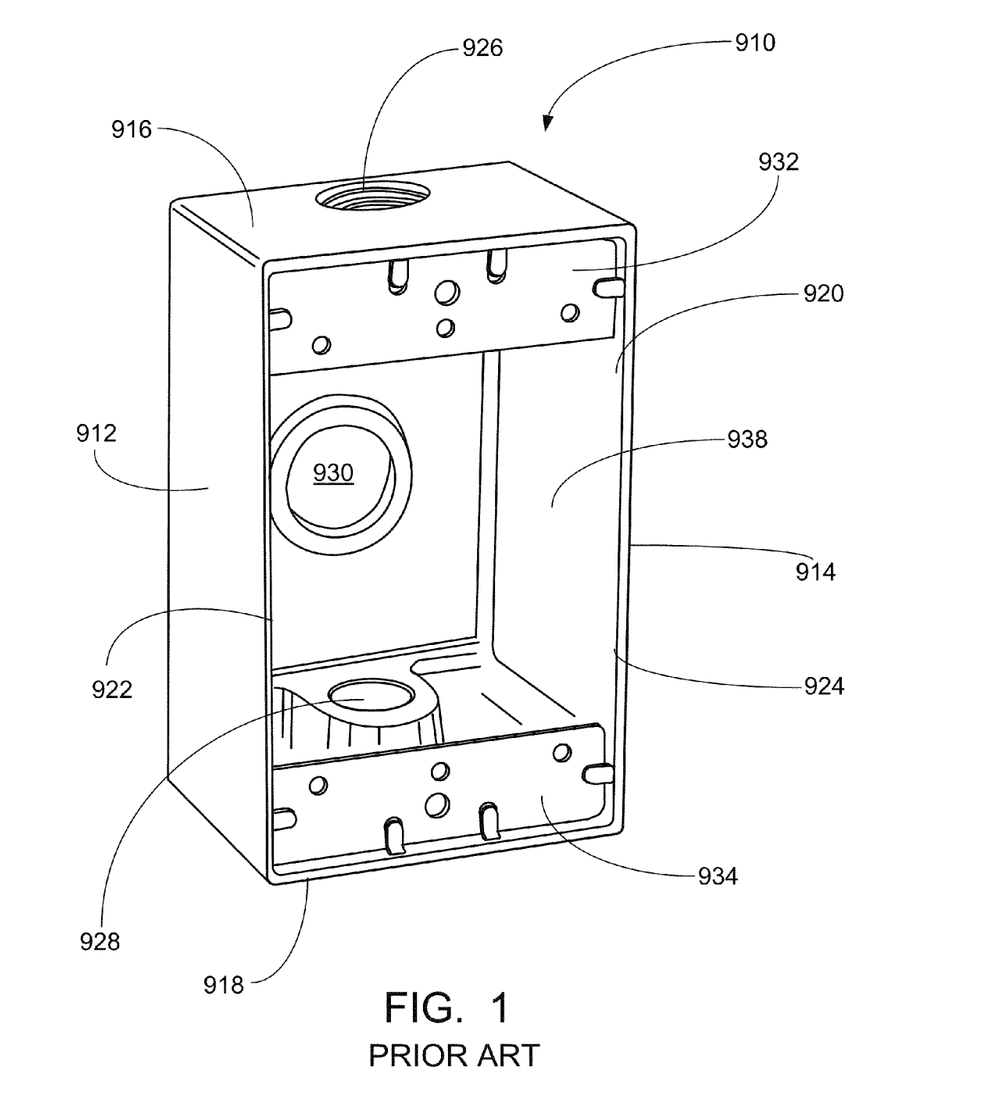
FIG. 1 is a perspective view of a prior art outdoor metallic box without a cover.
Figure 2:
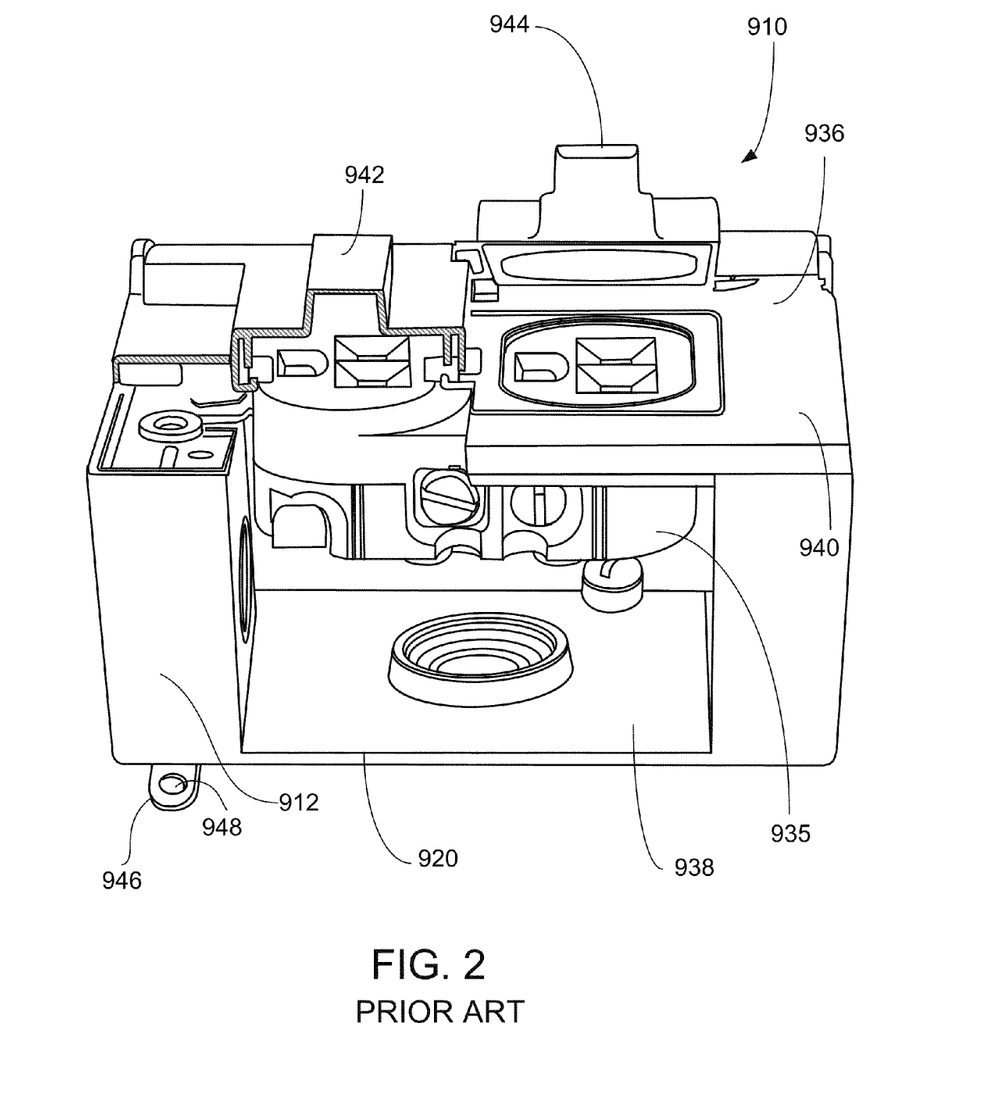
FIG. 2 is a perspective, cut away view of a prior art outdoor metallic box with a cover.

Some of the weatherproof electrical boxes currently in use are metallic boxes that are constructed from a die cast metal such as aluminum or zinc. These boxes have a rigid construction and protect the devices and wiring housed inside from dirt and moisture as well as physical abuse. FIGS. 1 and 2 show a typical metallic box 910 with two side walls 912, 914 and two end walls 916, 918 extending from a back wall 920 to define an interior 922 and an open front side 924. The opposing end walls 916, 918 and the back wall 920 each have a threaded opening 926, 928 and 930, respectively, for receiving a fitting or conduit (not shown). The box 910 also has two faceplates 932, 934 (FIG. 1) extending from the end walls 916, 918 on the open front side 924 of the box 910, which are used for mounting electrical devices 935 (FIG. 2) such as receptacles and switches. The back wall 920 has a grounding boss 936 with a threaded aperture 938 that extends into the interior 922 and is used to receive a screw for securing a ground wire (not shown). FIG. 2 shows a cover 940 with two hinged lids 942, 944 attached to the open side 924 of the metallic box 910 to protect the receptacle 935 mounted in the box 910 from dirt and moisture when the receptacle 935 is not being used. A tab 946 with an aperture 948 extends outwardly from the exterior of the side wall 912 and is substantially coplanar with the exterior surface of the back wall 920. The aperture 948 is used for mounting the box 910 to a structure using a screw or bolt (not shown).

The outdoor metallic boxes currently in use generally have two designs for attaching the box to a structure. The first design attaches arms to at least two corners of the box (four may be needed for some installations) using small screws. Each arm typically has three holes—two for the small screws that attach the arm to the box and one for a larger screw that fastens the arm to the structure. The two small screws tend to strip and are difficult to seat in the tapped apertures in the box.

In another design, the metallic box has integral arms that are formed in four to eight locations at the corners of the box. The arms and the box are a formed as a single component part and the arms allow the user to install the box on a structure. The box is easy to install but has an irregular profile since the arms protruding from the corners are not flush with the surface of the side walls.

The prior art outdoor metallic boxes are designed to be used with standard size conduits and fittings. The boxes are generally constructed from zinc or aluminum using a die-casting process or another molding method. Typically, the end of the conduit is threaded (i.e., the "male end") and the outdoor metallic box has a threaded opening for receiving the conduit (i.e., the "female end"). In most cases, all of the openings in the box for connecting conduits are the same size. For example, all of the conduit connections for the box can be ½-inch or ¼-inch NPT (National Pipe Thread). Only one size conduit with a diameter and thread size that matches the opening can be connected to the box. If a larger or smaller diameter (e.g., from a ½-inch to a ¼-inch diameter) conduit is used, an entirely new box would be needed with a different diameter and different female mating threads. In order to use a box with a different size connection, an adapter fitting is needed to either increase or reduce the size of the conduit connection. This increases the cost of the materials and labor for installing an outdoor metallic box. In cases where a larger connection is needed (e.g., a 1-inch NPT), the user could drill a larger hole and tap new threads but this is prohibitively expensive.

The outdoor metallic boxes currently in use are limited because they typically can only be connected to conduits of a single size. As a result, the user must stock boxes with different size connections to accommodate different size conduits. This is expensive and inconvenient for the user.

The outdoor metallic electrical outlet boxes that are currently in use generally have two or more openings in the side walls or back wall that can be used for connecting conduits or fittings. The boxes have a standard number of threaded openings and, after they are installed, the user blocks off the unused openings with a metal or plastic plug. The plug typically has a cut out trench or groove on the top surface of the plug that allows the plug to be rotated using a screw driver. The plug is screwed into the unused opening until it is securely held in place by the threads. The installation of the plugs in the unused openings of the box adds more components to the overall product and requires additional steps for the end user. In order to provide a watertight seal, the plug threads must be coated with a sealant before the plug is inserted in the opening, which adds additional steps and cost to the installation.

Accordingly, there is a need for an outdoor metallic electrical outlet box that can be mounted to a structure without requiring additional mounting hardware that extends from or is connected to the side walls of the box. There is also a need for an outdoor metallic box that can be connected to different size conduits without requiring an adapter fitting or reworking. In addition, there is a need for an outdoor metallic electrical outlet box that has plugs for unused connections that can be easily installed by the manufacturer and easily removed by the user.

SUMMARY OF THE INVENTION

In accordance with a first embodiment of the present invention, an outdoor metallic electrical outlet box is provided. The box includes a back wall having a perimetrical edge and an interior portion; a side wall extending from the back wall to an open front to define a box interior; and one or more niches. Each niche has a base integrally formed in the back wall that extends inwardly from the perimetrical edge to the interior portion of the back wall to a recessed side wall and does not extend beyond the perimetrical edge of the back wall. The recessed side wall extends from the base to a point on the side wall of the box intermediate the base and the open front. Preferably, the recessed side wall tapers towards the side wall of the box as it extends from the base and has a curved shape. Each base has a mounting screw aperture for attaching the electrical outlet box to a structure.

The side wall of the electrical outlet box typically has two ends and two sides, and each of the ends preferably has a pair of niches. In addition, the recessed side wall of each of the one or more niches has an outer surface in the box interior. The outlet box can have a boss that extends from the outer surface of each niche to a terminus near the open front of the box. The terminus of the boss can have a threaded aperture that is adapted for mounting an electrical device in the electrical outlet box.

The recessed side wall of each of the one or more niches extends upwardly from the base and towards the side wall of the box at an angle of from about 45 to about 75 degrees. Each of the one or more niches forms an opening in the side wall that does not provide access to the box interior. This isolates the niches from the interior of the box so that moisture and dust cannot enter the box through the niches. The base of each of the one or more niches can be angularly disposed in relation to the back wall of the outlet box so that the base slopes downwardly towards the perimetrical edge of the back wall. This makes it easier for the user to install mounting screws through the apertures in the base of the niche.

The outlet box can also include at least one hub extending interiorly from the back wall or the perimetrical side wall and at least one opening extending through the back wall or perimetrical side wall and the at least one hub. The at least one opening has a dual size connection with a first section between the exterior and a point intermediate the exterior and the interior of the box and a second section between the point and the interior. The first and second sections have first and second diameters and first and second thread sizes, respectively. The diameter of the opening in the first section is larger than the diameter of the opening in the second section. The first and second thread sizes can be the same or different. Different sizes of pipe or conduit can be threaded into either the first or second sections of the opening.

The dual size connection in the outdoor metallic electrical outlet box allows the box to be used with conduits of more than one size without an adapter fitting. The combination of sizes of the first and second diameters can vary. Preferably, the smaller diameter is ½-inch and the larger diameter is ¼-inch, 1-inch, 1¼-inch, 1½-inch or 2-inch or the smaller diameter is ¾-inch and the larger diameter is 1-inch, 1¼-inch, 1½-inch or 2-inch or the smaller diameter is 1-inch and the larger diameter is 1¼-inch, 1½-inch or 2-inch. However, other combinations of sizes are contemplated and the invention is not limited to the sizes that are listed.

The outdoor metallic electrical outlet box can also include at least one aperture extending through the back wall or perimetrical side wall and a removable disc in the at least one aperture. The removal of the removable disc provides access to the interior through the at least one aperture.

BRIEF DESCRIPTION OF THE FIGURES

The preferred embodiments of the outdoor metallic electrical outlet box of the present invention, as well as other objects, features and advantages of this invention, will be apparent from the accompanying drawings wherein.

DETAILED DESCRIPTION OF THE INVENTION

The present invention is an outdoor metallic box with improved mounting and connection features. One embodiment of the present invention provides an outdoor metallic electrical outlet box with angled mounting slots or niches for attaching the box to a structure. The angled mounting slots allow the user to fasten an outdoor metallic electrical box to a structure using mounting apertures formed within the dimensions of the box. The angled mounting slots receive the screw/fastening devices inside the walls of the box so that bracket or other mounting hardware is not connected to the exterior walls of the box and do not detract from the appearance of a clean and flush profile when viewed form the front of the box.

The invention allows the end user to attach the box to a structure using up to four fastening locations, while maintaining the overall flush profile for the sides of the box when viewed head-on. This is accomplished by creating angled slots or niches (i.e., cut out recesses) in the side and/or end walls of the box for receiving a screw or other type of fastener inside the walls of the box. The niches are recessed in the walls of the box and have a base formed by the back wall. The sides of the niches are preferably curved and are formed by the recessed walls of the box so that the niches are isolated from the interior of the box. This prevents dirt or moisture from entering the interior of the box through the niches. The angled mounting slots also make it easier for the user to install the screws and tightly secure the box to a structure. The exterior of the back wall of the box can have small rough peaks or an irregular surface in order to grip the surface of a structure and maintain the position of the box during installation. The angled mounting slots or niches are recessed in the walls of the box and have an angled base with an aperture that receives the mounting screws. The bases are angled downwardly towards the perimetrical edge of the back wall to make it easier for the user to install the screw without interference from the side wall of the box.

A second embodiment of the present invention provides an outdoor metallic electrical outlet box with openings for connecting electrical conduits that can accommodate conduits of two different sizes. This design allows the same box to be used for connecting two or more different size conduits or fittings. The boxes currently in use are limited to conduits having one specific diameter size (e.g., a ½-inch pipe can only be used with a box having ½-inch connections). Thus, a different size box is required for each conduit size that is used. The boxes of the present invention have dual size connections, which allow a single box to be used for more than one conduit size. This reduces the number of different boxes that the user must stock, while providing flexibility for conduit installation.

The outdoor metallic boxes with the dual connection can be installed on at least two different diameters of male conduits/fittings. This is achieved through a "stepped" construction where the connection is formed in a hub having two sections and one aperture with different diameter for each section. The first section of the dual connection has a terminus at the opening on the outside of the box and a first thread size and a first diameter that preferably corresponds to a standard (such as NPT) thread size. The second section of the dual connection has a terminus at the opening on the inside of the box and a second thread size and a second diameter that preferably corresponds to a standard thread size. The thread size for the first section is larger than the thread size of the second section so that a smaller conduit can pass through the first section without engaging the threads and be connected to the threads in the second section. Preferably, the first section extends from the outer wall of the box to about the midpoint of the connection opening, most preferably beyond the midpoint, and the second section extends from where the first section ends to the interior wall of the box. The depth of the first section is preferably greater than the depth of the second section because the larger diameter of the threaded connection in the first section may require larger threads than the smaller second section. However, although the sizes of the threads can be different, the number of threads in each section is approximately the same to ensure that the conduit is tightly secured in the box when either the first or second section is used. The stepped geometry of the dual connections allows two conduits or fittings of different sizes to be installed in a single opening in the box without an adapter fitting or modification by the user.

The dual connections of the outdoor metallic box allow one box to be used to connect two or more different size conduits. In addition, the box preferably has multiple openings for connecting conduits (e.g., the box can have openings in any of the four side walls and back wall), which can be the same size or different. This is especially useful when the box is being used as a pull box or a splitter box. For example, the opposing ends of the box can have dual connections that accommodate ¾-inch and 1-inch conduits for the primary run of cables and the opposing sides of the box can have dual connections that accommodate ½-inch and ¼-inch conduits for connections to individual electrical devices, such as lights or electrical receptacles.

In preferred embodiments, the outdoor metallic electrical outlet box includes: a back wall, a perimetrical side wall and one or more dual connectors in the side wall and/or back wall. The back wall is substantially flat and can have a variety of different shapes depending on the configuration of the perimetrical side wall. Preferably, the perimetrical side wall is rectangular or square and includes a pair of opposing end walls and a pair of opposing side walls that extend from the outer edge of the back wall to an open front to define a box interior. However, the perimetrical side wall can have other configurations that provide a round or oval shape or a plurality of side wall sections that provide a triangular, pentagonal, hexagonal, heptagonal or octagonal shape.

The dual connectors in the side wall and/or back wall are formed by a hub that extends interiorly from the back wall or the perimetrical side wall and has a stepped construction that is formed by a first section and a second section. Each dual connector has an opening that extends through the first and second sections of the hub. The first section has an opening with a first diameter that is sized to accommodate a threaded conduit of a first size and the second section has an opening with a second diameter that is sized to accommodate a threaded conduit having a second size. The diameter of the second section is smaller than the diameter of the first section. This allows the dual connector to threadably receive a large conduit in the first section and a smaller conduit in the second section.

A third embodiment of the present invention provides an outdoor metallic electrical outlet box with removable discs (also referred to herein as tabs or knockouts) sealably installed in the openings for the conduit connections. The box is typically provided with a disc in each opening which seals the interior of the box from dust and moisture. The removable discs allow the end user to select the openings that will be used in a particular application and remove one or more of the discs accordingly. The openings for the unused connections in the box remain sealed so that it is unnecessary for the user to install water-tight "plugs."

The removable discs require the end user to only remove the discs in the openings that are utilized, as opposed to threading the desired pipe/fitting into selected opening(s) in the box and then sealing the unused openings. To remove the discs, the end user simply places the box on a stable surface prior to installation with a selected opening facing up. A screwdriver or similar tool can then be used to punch out the disc. After the disc is punched out, the user can remove any remaining pieces of the disc. This procedure is repeated until the discs have been removed from all of the selected openings that are intended to be used. The box is then mounted and the conduits installed.

In another embodiment, the discs are threadably inserted into the openings from the exterior side of the box when the box is manufactured. The edges of the discs are adapted to engage the threads of the openings in the box when the discs are installed. The end of the opening on the interior side of the box has a lip extending inwardly which prevents the disc from passing into the interior of the box. When the disc is fully inserted in the opening, the edge of the disc is seated on the lip. An O-ring can be installed between the lip and the edge of the disc to form a water-tight seal. The user removes the discs from the openings that have been selected for use in a particular application by rotating the discs in a counterclockwise direction.

To facilitate the rotation of the disc, the disc can have a groove across its midsection that can be engaged by a screwdriver. In another embodiment, the disc has two or more stubs or raised portions positioned near the outer perimeter. These stubs or raised portions are positioned a sufficient distance from the edge of the disc so that they do not interfere when the disc is threaded into the opening in the box. A tool can be used to engage or grasp the stubs or raised portions and rotate the disc when it is installed or removed.

Figure 3:
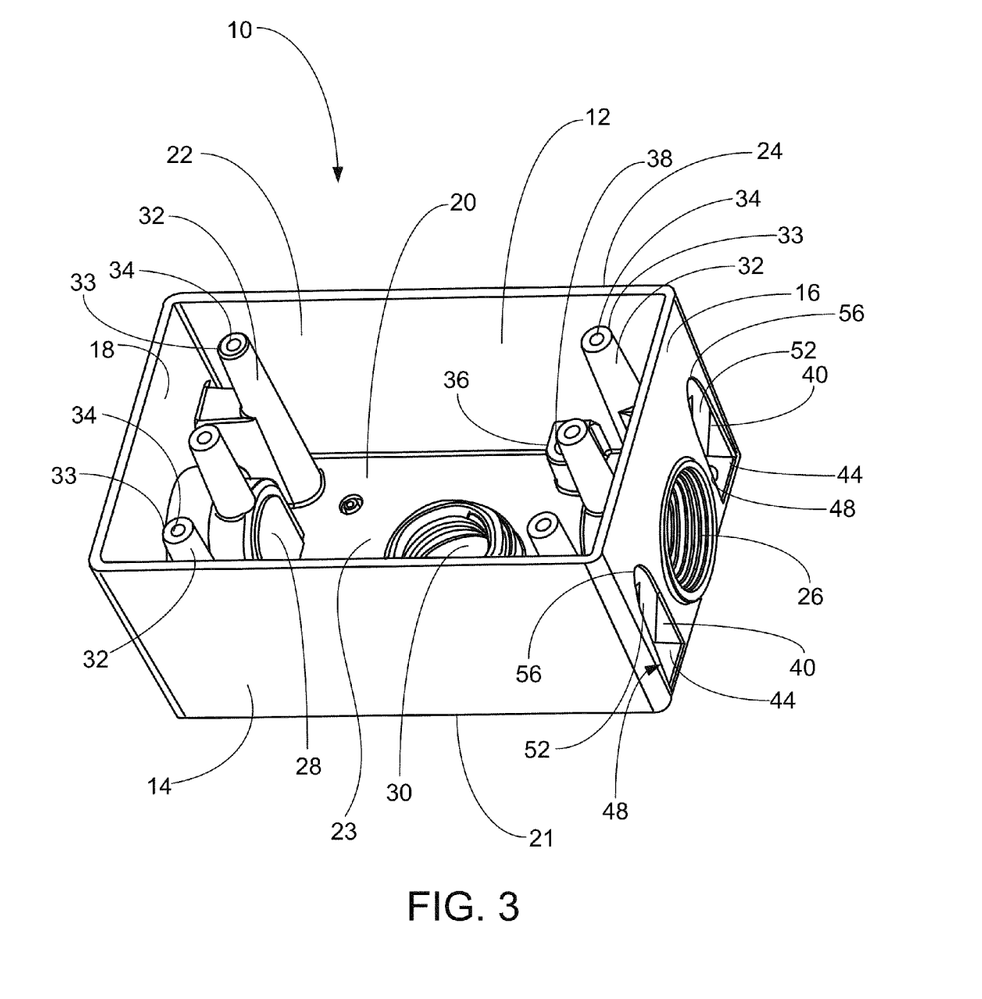
FIG. 3 is a side, perspective view of the outdoor metallic box of the present invention without a cover.
Figure 4:
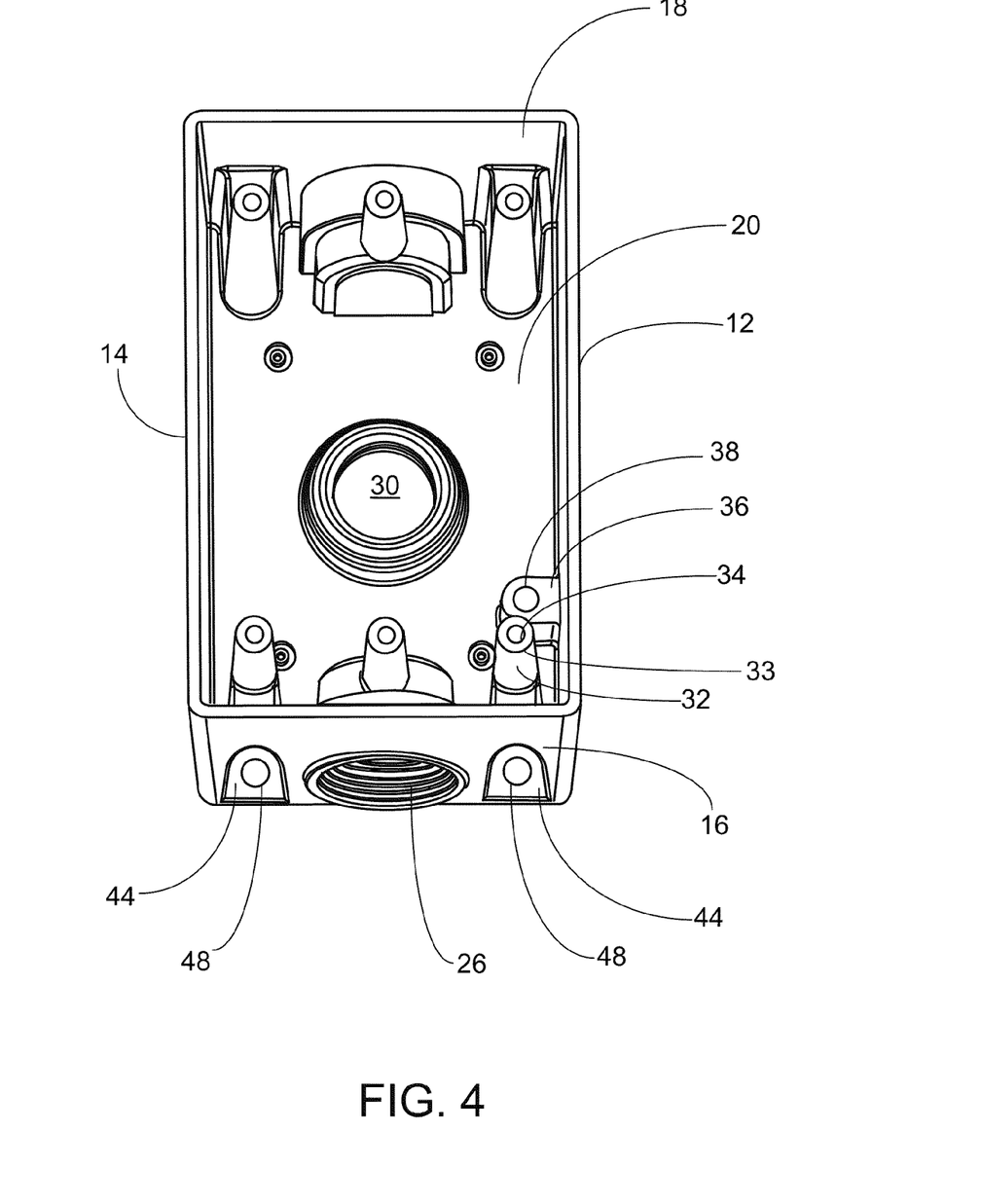
FIG. 4 is an end, perspective view of the outdoor metallic box without a cover shown in FIG. 3.

Referring now to the drawings, FIGS. 3 and 4 show an embodiment of the outdoor metallic box 10 with two side walls 12, 14 and two end walls 16, 18 extending from a back wall 20 to define an interior 22 and an open front side 24. The opposing end walls 16, 18 and the back wall 20 each have an opening 26, 28 and 30, respectively, for receiving a conduit (not shown). The box 10 also has a plurality of bosses 32 extending from the back wall 20 to a point near or just below the open front side 24 of the box 10. The terminus 33 of the bosses 32 have threaded apertures 34, which are used for attaching a cover plate (not shown) or mounting electrical devices (not shown) such as receptacles and switches in the box 10. A grounding boss 36 with a threaded aperture 38 extends into the interior 22 of the box 10 from the back wall 20 and is used to receive a screw for securing a grounding wire (not shown). The grounding boss 36 provides a means for grounding the electrical device (not shown) that is installed in the box 10.

Figure 7:
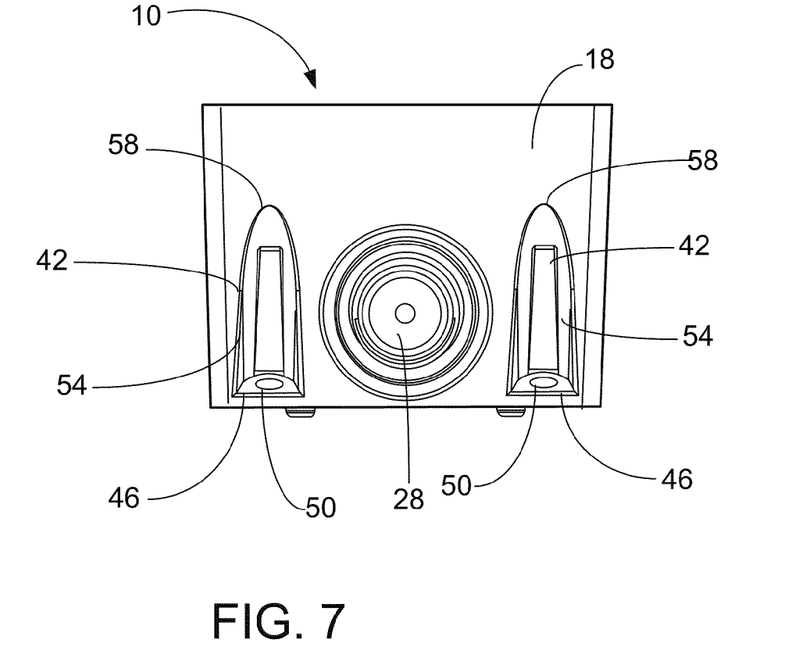
FIG. 7 is an end view of the outdoor metallic box without a cover shown in FIG. 5.

FIGS. 3 and 7 show a pair of niches 40, 42 on either side of the threaded openings 26, 28 on the opposing ends 16, 18 of the box 10. Each niche 40, 42 has a base 44, 46 that extends from the perimetrical edge 21 of the back wall 20 to a recessed side wall 52, 54 in the interior portion 23 of the back wall 20. The base 44, 46 is formed by the back wall 20 with an aperture 48, 50 in the base 44, 46 for receiving a mounting screw (not shown), which is used to mount the box 10 to a structure. The recessed side walls 52, 54 can be curved and are integrally formed as part of the end walls 16, 18. The recessed side walls 52, 54 are tapered as they extend from the base 44, 46 to a point 56, 58 intermediate the back wall 20 and the open front 24 where the recessed side walls 52, 54 merge with the end walls 16, 18. When the mounting screws are installed, the screw heads are recessed in the niches 40, 42 so the installed box 10 does not have mounting hardware extending from its sides.

Figure 5:
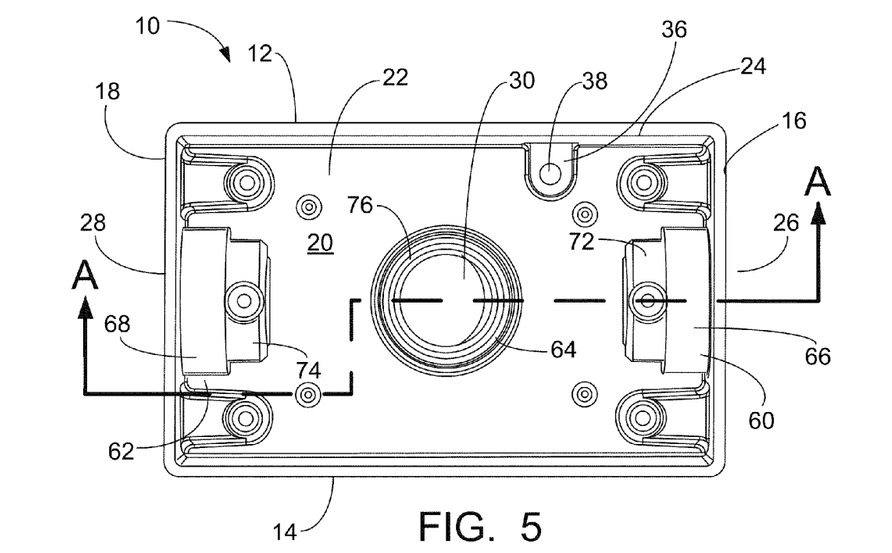
FIG. 5 is a top view of the open front side of the outdoor metallic box without a cover shown in FIG. 3.

FIG. 5 shows a top view of the box 10 from the open front side 24 looking into the interior 22. The threaded openings 26, 28 and 30 for receiving a conduit in the opposing end walls 16, 18 and the back wall 20, respectively, each extend through the wall 16, 18, 20 and a hub 60, 62, 64, respectively, that is integrally formed as part of the wall 16, 18, 20. The hubs 60, 62, 64 have a first section 66, 68, 70 and a second section 72, 74, 76, wherein the inside diameter or conduit thread size is larger in the first section 66, 68, 70 than in the second section 72, 74, 76. The hubs 60, 62, 64 are "stepped-down" so that the first section 66, 68, 70 can receive a threaded conduit (not shown) that is larger than the threaded conduit (not shown) that can be received by the second section 72, 74, 76. This allows the same box 10 to be used for two different sizes of conduit. For example, the first section 66, 68, 70 can be designed to accommodate a ¾-inch conduit, while the second section 72, 74, 76 can be designed to accommodate a ½-inch conduit.

Figure 6:
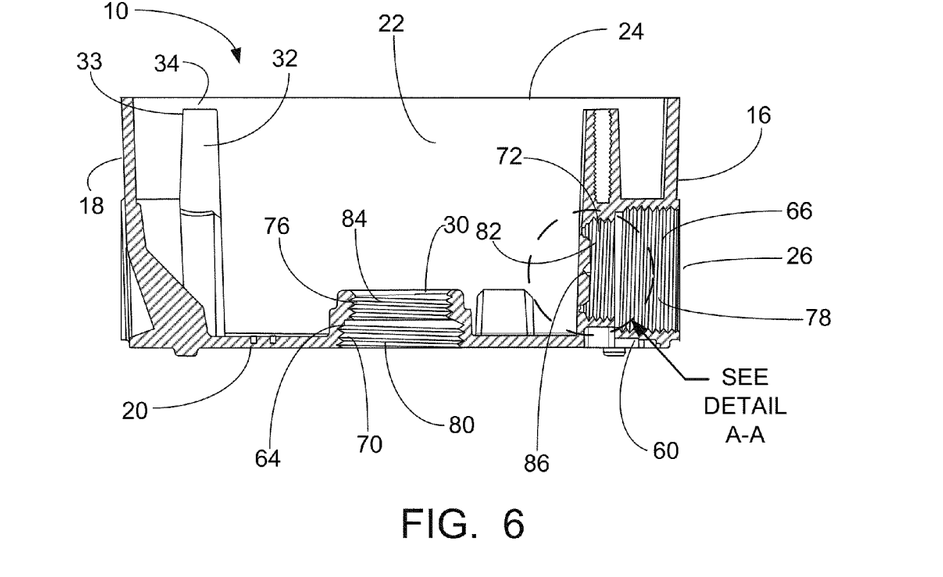
FIG. 6 is a side, sectional view of the outdoor metallic box shown in FIG. 5.

FIG. 6 shows a side, sectional view of the box 10 and illustrates how the first sections 66, 70 and second sections 72, 76 of the hubs 60, 64 extend into the interior 22 of the box 10 from the end wall 16 and back wall 20, respectively. The hubs 60, 64 provide the openings 26, 30 with additional depth compared to prior art boxes that have the threads for receiving conduit formed in the wall. This allows a sufficient number of threads 78, 80 and 82, 84 to be formed in the first sections 66, 70 and second sections 72, 76, respectively, to retain conduits (not shown). Without the additional depth provided by the hubs 60, 64, an insufficient number of threads on the conduit would engage the threads 78, 80 or 82, 84 of the hubs 60, 64 to provide a secure connection.

Figure 8:
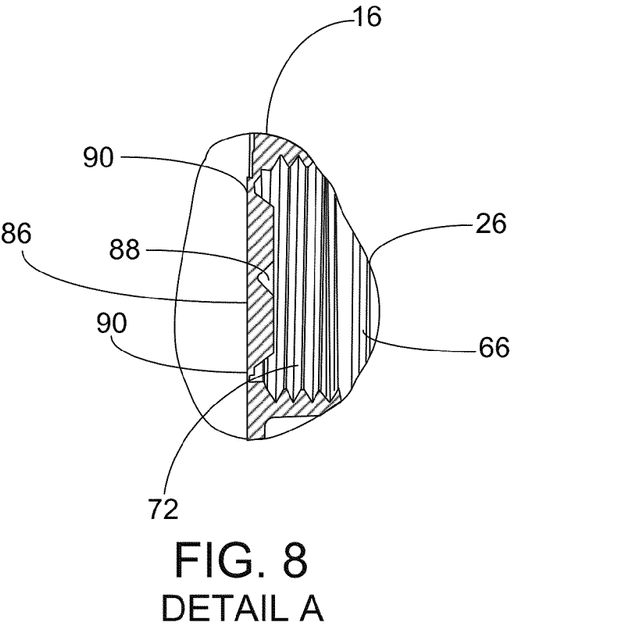
FIG. 8 is a detail side view of the threaded aperture of the outdoor metallic box shown in FIG. 6.

FIG. 8 is a detail of the hub 66 in FIG. 6 and shows a sectional view of the first and second sections 66, 72 in the end wall 16. A disc 86 is located at the end of the second section 72 and it seals the opening 26 in the box 10. The disc 86 has a groove 88 near its midsection which can be engaged by a screwdriver (not shown). The perimeter 90 of the disc 86 is sealably connected to the interior of the end wall 16. When the box 10 is installed, the user determines which of the three openings 26, 28, 30 (see FIGS. 3 and 7) will be used to connect one or more conduits (not shown). For example, if the opening 26 in end wall 16 is to be used, the seal is broken by inserting a screwdriver or similar tool through the opening 26 and into the groove 88 and then applying enough force to punch out the disc 86. After the disc 86 is removed, the conduit can be threaded into either the first section 66 or second section 72 of the hub 66.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An outdoor metallic electrical outlet box comprising:
a back wall having a perimetrical edge and an interior portion;
a side wall extending from the back wall to an open front to define a box interior; and
one or more niches, wherein each niche has a base integrally formed in the back wall and extending from the perimetrical edge to the interior portion of the back wall to a recessed side wall, wherein the recessed side wall extends from the base to a point on the side wall intermediate the base and the open front, and wherein each base has a mounting screw aperture.

2. The outdoor metallic electrical outlet box according to claim 1, wherein the recessed side wall tapers towards the side wall of the box as it extends from the base.

3. The outdoor metallic electrical outlet box according to claim 1, wherein the recessed side wall is curved.

4. The outdoor metallic electrical outlet box according to claim 1, wherein the side wall of the electrical outlet box has two ends and two sides, and wherein each of the ends has a pair of niches.

5. The outdoor metallic electrical outlet box according to claim 1, wherein the recessed side wall of each of the one or more niches has an outer surface in the box interior, and wherein a boss extends from the outer surface to a terminus near the open front of the box.

6. The outdoor metallic electrical outlet box according to claim 5, wherein the terminus of the boss has a threaded aperture that is adapted for mounting an electrical device in the electrical outlet box.

7. The outdoor metallic electrical outlet box according to claim 1, wherein each of the one or more niches does not extend beyond the perimetrical edge of the back wall.

8. The outdoor metallic electrical outlet box according to claim 1, wherein the recessed side wall of each of the one or more niches extends upwardly from the base at an angle of from about 45 to about 75 degrees.

9. The outdoor metallic electrical outlet box according to claim 1, wherein each of the one or more niches forms an opening in the side wall, and wherein the opening does not provide access to the box interior.

10. The outdoor metallic electrical outlet box according to claim 1, wherein the base of each of the one or more niches is angularly disposed in relation to the back wall of the outlet box so that the base slopes downwardly towards the perimetrical edge of the back wall.

11. The outdoor metallic electrical outlet box according to claim 1, wherein the box further comprises at least one hub extending interiorly from the back wall or the perimetrical side wall and at least one opening extending through the back wall or perimetrical side wall and the at least one hub, wherein the at least one opening has a first diameter between the exterior and a point intermediate the exterior and the interior and a second diameter between the point and the interior, and wherein the first diameter is larger than the second diameter, wherein the hub has a plurality of threads corresponding to the first diameter and having a first thread size and a plurality of threads corresponding to the second diameter and having a second thread size, and wherein the first thread size and the second thread size can be the same or different.

12. The outdoor metallic electrical outlet box according to claim 1, wherein the box further comprises at least one aperture extending through the back wall or perimetrical side wall and a removable disc in the at least one aperture, wherein the removal of the removable disc provides access to the interior through the at least one aperture.

13. An outdoor metallic electrical outlet box comprising:
   a back wall having a perimetrical edge and an interior portion;
   a side wall extending from the back wall to an open front to define a box interior; and
   one or more niches, wherein each niche has a base integrally formed in the back wall and extending from the perimetrical edge to the interior portion of the back wall to a recessed side wall, wherein the recessed side wall extends from the base to a point on the side wall intermediate the base and the open front, wherein the recessed side wall tapers towards the side wall of the box as it extends from the base, wherein each base has a mounting screw aperture, wherein each of the one or more niches forms an opening in the side wall, and wherein the opening does not provide access to the box interior.

14. The outdoor metallic electrical outlet box according to claim 13, wherein the recessed side wall is curved.

15. The outdoor metallic electrical outlet box according to claim 13, wherein the side wall of the electrical outlet box has two ends and two sides, and wherein each of the ends has a pair of niches.

16. The outdoor metallic electrical outlet box according to claim 13, wherein the recessed side wall of each of the one or more niches has an outer surface in the box interior, wherein a boss extends from the outer surface to a terminus near the open front of the box, and wherein the terminus of the boss has a threaded aperture that is adapted for mounting an electrical device in the electrical outlet box.

17. The outdoor metallic electrical outlet box according to claim 13, wherein the recessed side wall of each of the one or more niches extends upwardly from the base at an angle of from about 45 to about 75 degrees.

18. An outdoor metallic electrical outlet box comprising:
   a back wall having a perimetrical edge and an interior portion;
   a side wall extending from the back wall to an open front to define a box interior; and
   one or more niches, wherein each niche has a base integrally formed in the back wall and extending from the perimetrical edge to the interior portion of the back wall to a curved recessed side wall, wherein the curved recessed side wall extends from the base to a point on the side wall intermediate the base and the open front and has an outer surface in the box interior, and wherein each base has a mounting screw aperture; and
   a boss extending from the outer surface of the recessed side wall of each of the one or more niches to a terminus near the open front of the box, wherein the terminus of the boss has a threaded aperture that is adapted for mounting an electrical device in the electrical outlet box.

19. The outdoor metallic electrical outlet box according to claim 18, wherein the base of each of the one or more niches is angularly disposed in relation to the back wall of the outlet box so that the base slopes downwardly towards the perimetrical edge of the back wall.

20. The outdoor metallic electrical outlet box according to claim 18, wherein the recessed side wall tapers towards the side wall of the box as it extends from the base.

* * * * *

UNITED STATES PATENT AND TRADEMARK OFFICE
CERTIFICATE OF CORRECTION

| | | |
|---|---|---|
| PATENT NO. | : 8,158,884 B2 | Page 1 of 1 |
| APPLICATION NO. | : 12/619207 | |
| DATED | : April 17, 2012 | |
| INVENTOR(S) | : Ian Rubin de la Borbolla | |

It is certified that error appears in the above-identified patent and that said Letters Patent is hereby corrected as shown below:

Column 2, line 36:

Now reads:    "or ¼-inch NPT"

Should read:    --or ¾-inch NPT--

Column 2, line 40:

Now reads:    "½-inch to a ¼-inch"

Should read:    --½-inch to a ¾-inch--

Column 4, line 6:

Now reads:    "¼-inch, 1-inch"

Should read:    --¾-inch, 1-inch--

Column 6, line 1:

Now reads:    "½-inch and ¼-inch conduits"

Should read:    --½-inch and ¾-inch conduits--

Signed and Sealed this
Thirty-first Day of July, 2012

David J. Kappos
*Director of the United States Patent and Trademark Office*